US008929525B1

(12) United States Patent
Edwards

(10) Patent No.: US 8,929,525 B1
(45) Date of Patent: Jan. 6, 2015

(54) ON-DEMAND VIDEO COMMUNICATION FOR CONTROLLED-ENVIRONMENT FACILITY RESIDENTS

(71) Applicant: Securus Technologies, Inc., Dallas, TX (US)

(72) Inventor: Adam C. Edwards, Fort Worth, TX (US)

(73) Assignee: Securus Technologies, Inc., Dallas, TX (US)

( * ) Notice: Subject to any disclaimer, the term of this patent is extended or adjusted under 35 U.S.C. 154(b) by 0 days.

(21) Appl. No.: 14/323,582

(22) Filed: Jul. 3, 2014

(51) Int. Cl.
H04M 15/00 (2006.01)
(52) U.S. Cl.
CPC ..................... *H04M 15/61* (2013.01)
USPC ................. 379/114.21; 348/14.01; 379/188
(58) Field of Classification Search
CPC ..... H04M 3/2281; H04M 3/38; H04M 15/00; H04M 15/47; H04M 15/68
USPC .................. 379/114.21, 114.23, 114.24, 188; 348/14.01, 14.08
See application file for complete search history.

(56) References Cited

U.S. PATENT DOCUMENTS

| 2005/0031092 A1* | 2/2005 | Umemura et al. ......... 379/88.13 |
| 2013/0227149 A1* | 8/2013 | Athlur et al. .................. 709/227 |
| 2014/0267547 A1* | 9/2014 | Torgersrud et al. ........ 348/14.02 |
| 2014/0273929 A1* | 9/2014 | Torgersrud .................... 455/406 |

* cited by examiner

*Primary Examiner* — Quoc D Tran
(74) *Attorney, Agent, or Firm* — Fogarty, L.L.C.

(57) ABSTRACT

During a voice call from a resident of a controlled-environment facility to another party, a selection of an option by the resident or the other party to convert the voice call to a video communication between the resident and the other party may be made. Whereupon, a controlled-environment communications processing system may confirm that the other call party agrees to convert the voice call to a video communication, and may query a controlled-environment facility administration and management system to confirm that the resident may take part in a video communication. Thereafter, such as in response to confirmation both parties agree to convert the voice call to a video communication and/or that the resident may take part in a video communication, a video communication link may be established between a communication device in use by the resident and a communication device in use by the other party.

25 Claims, 3 Drawing Sheets

ON-DEMAND VIDEO COMMUNICATION FOR CONTROLLED-ENVIRONMENT FACILITY RESIDENTS

TECHNICAL FILED

The present disclosure is directed to systems and methods for providing communication services to residents of controlled-environment facilities, more particularly to providing video communication for such residents, and specifically to providing on-demand video communication for controlled-environment facility residents.

BACKGROUND

According to the International Centre for Prison Studies, the United States has the highest prison population per capita in the world. In 2009, for example, 1 out of every 135 U.S. residents was incarcerated. Typically, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, etc. More recently, technological advances have allowed jails and prisons to provide other types of visitation, including videoconferences and online chat sessions.

To enable these various types of communications, a jail or prison may install communication devices in different parts of the facility. Such communication devices are dedicated to provide inmate contact with the outside world. These devices are located in different areas throughout the facility. Traditionally controlled-environment facility communication vendors have provided services that allow residents of a controlled-environment facility to initiate phone calls and conduct voice communication with non-residents of a controlled-environment facility. This is typically referred to as an inmate outbound call. Alternatively, non-residents of a controlled-environment facility can pay for a scheduled video visitation event to occur where both the resident and the non-resident log into a video visitation application at the scheduled time to have a video conversation.

SUMMARY

The present systems and methods are directed to providing on-demand video visitation for controlled-environment facility residents. In accordance with embodiments of the present systems and methods, a voice call from a resident of a controlled-environment facility to another party may be connected by a controlled-environment facility communications processing system. The other party may be a non-resident of a controlled-environment facility, or in accordance with some embodiments, a resident of the same or different controlled-environment facility. The controlled-environment facility communications processing system may offer the resident and the other party an opportunity to convert the voice call to a video communication, and/or the controlled-environment facility communications processing system may accept a selection of an option by the resident or the other party to convert the voice call to a video communication between the resident and the other party. Thereafter, the controlled-environment facility communications processing system may establish a video communication link between a communication device in use by the resident and a communication device in use by the other party.

Also, in accordance with various embodiments, the controlled-environment facility communications processing system may confirm, prior to establishing the video communications link, that the resident or other party, who did not select the option to convert the voice call to a video communication, agrees to convert the voice call to a video communication.

Additionally or alternatively, prior to establishing the video communications link, the controlled-environment facility communications processing system may confirm that the resident may take part in a video communication, such as by querying a controlled-environment facility administration and management system.

Further, prior to establishing the video communications link, the controlled-environment facility communications processing system may accept payment from the resident or the other party for payment of the video communication. For example, by charging a resident communications account maintained by the controlled-environment facility for the benefit of the resident for payment of the video communication, such as maintained by a controlled-environment administration and management system and/or a resident account management system. In embodiments wherein the other party is a resident of the same or different controlled-environment facility a community communications account maintained by at least one of the controlled-environment facilities for the benefit of both of the residents may be charged for payment of the video communication, such as maintained by a controlled-environment administration and management system and/or a resident account management system.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processors, wherein the memory is configured to store program instructions executable by the processor(s) to cause the system(s) to execute one or more operations disclosed herein.

BRIEF DESCRIPTION OF THE DRAWINGS

Figure 1:
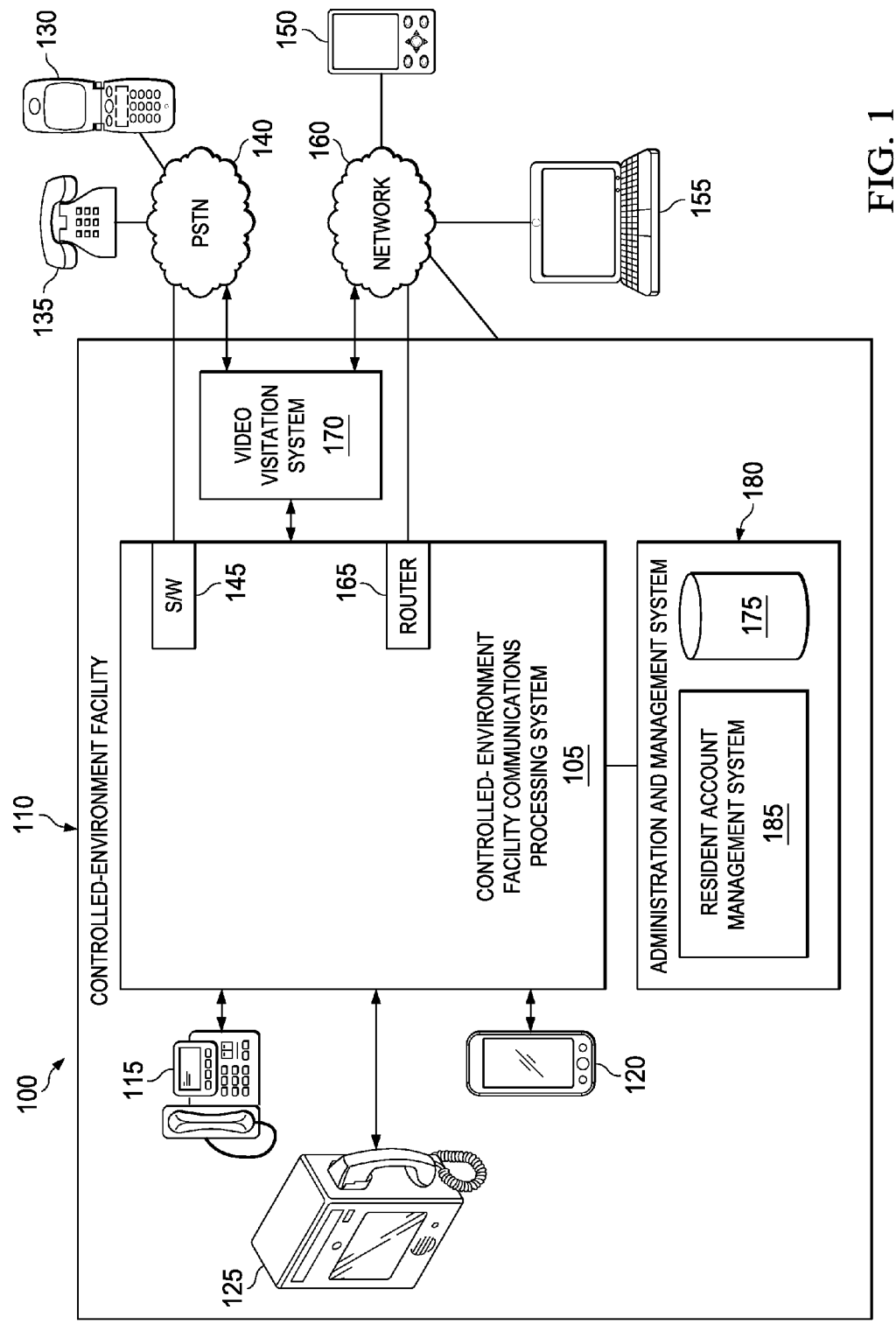
Figure 2:
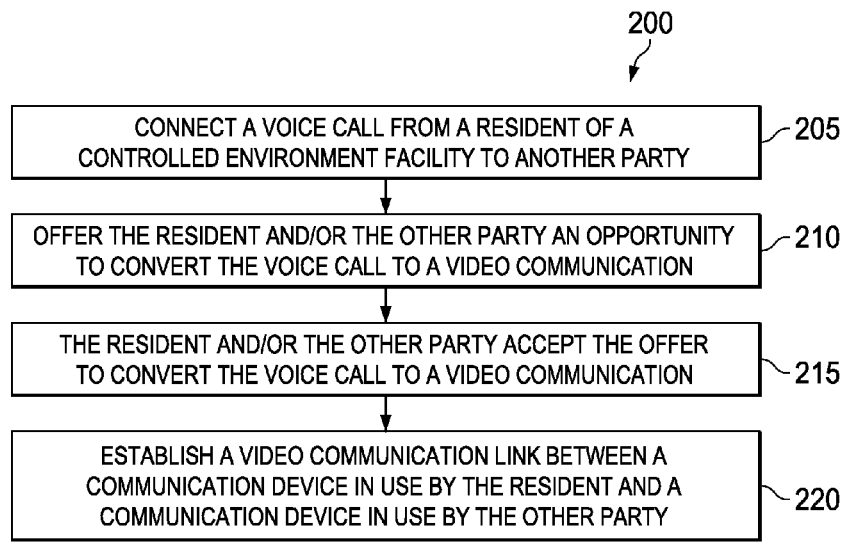
Figure 3:
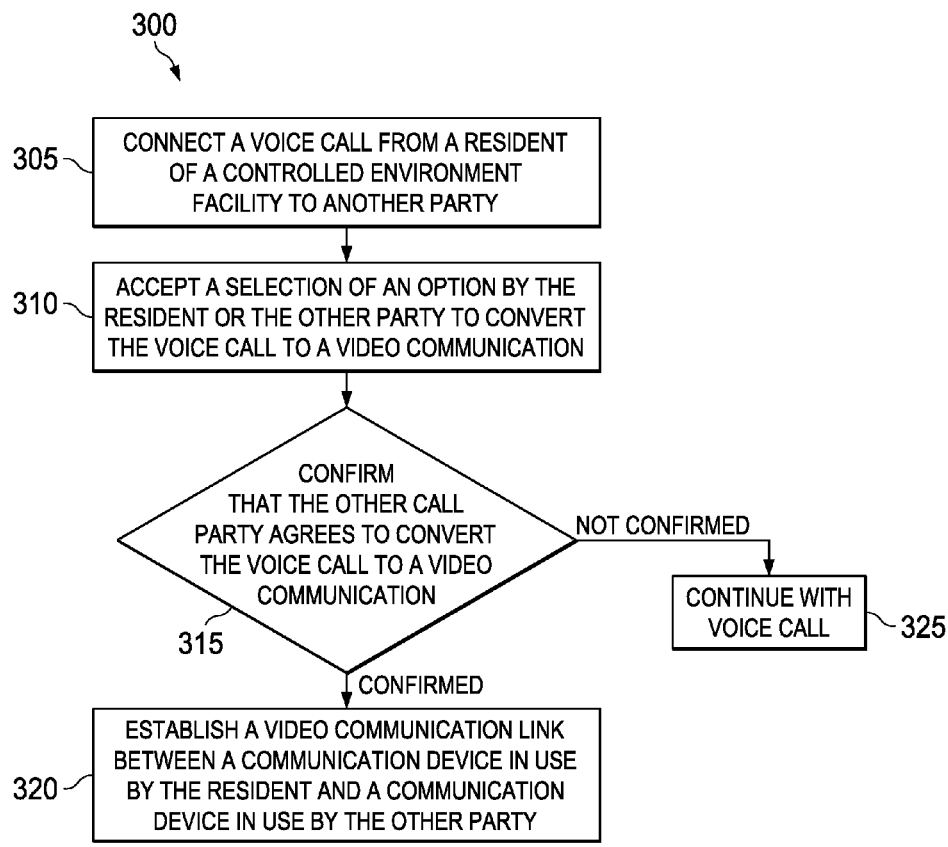
Figure 4:
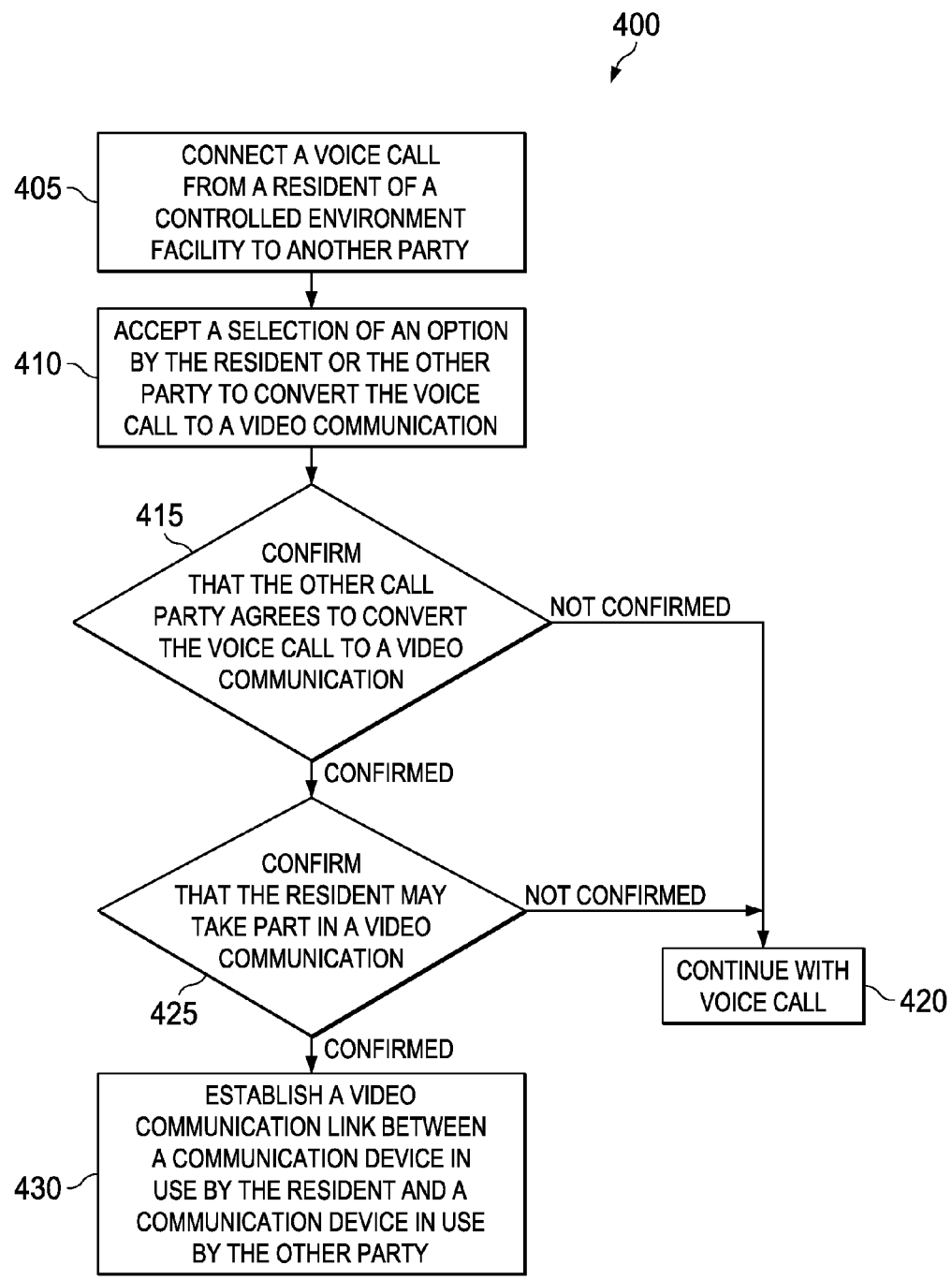

Having thus described the invention in general terms, reference will now be made to the accompanying drawings, which are not necessarily drawn to scale, and wherein:

FIG. 1 is a diagrammatic illustration of an example communications environment, wherein an example embodiment of the present systems and methods for providing on-demand video communication may be employed, according to some embodiments;

FIG. 2 is a flowchart of an example process for on-demand video communication for controlled-environment facility residents, in accordance with some embodiments;

FIG. 3 is a flowchart of another example process for on-demand video communication for controlled-environment facility residents, in accordance with some embodiments; and FIG. 4 is a flowchart of a further example process for on-demand video communication for controlled-environment facility residents, according to some embodiments.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

This description is directed to systems and methods for providing communication services to residents of controlled-environment facilities, more particularly to providing video communication for such residents, and specifically to providing on-demand video communication for controlled-environment facility residents. The present systems and methods provide embodiments that during a voice call from a resident of a controlled-environment facility to another party, a selection of an option by the resident or the other party to convert the voice call to a video communication between the resident and the other party may be made. Whereupon, a controlled-environment communications processing system may confirm that the other call party agrees to convert the voice call to a video communication, and may query a controlled-environment facility administration and management system to confirm that the resident may take part in a video communication. Thereafter, such as in response to confirmation both parties agree to convert the voice call to a video communication and/or that the resident may take part in a video communication, a video communication link may be established between a communication device in use by the resident and a communication device in use by the other party.

Various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. Such correctional facilities present numerous difficulties in areas such as security, surveillance, financial transactions, communications, visitation, investigation, budgetary, etc.; which in turn make technological implementations uniquely challenging in those environments. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. In many cases, technologies that are used outside of correctional facilities are not immediately applicable to the correctional environment without significant changes and modifications. Moreover, correctional facilities may have specific needs that are not particularly relevant outside of those environments. However, it should be understood, that the systems and methods described herein may be similarly applicable to other types of controlled-environment facilities and their respective residents (e.g., a hospital and its patients, a school dormitory and its students, etc.).

Typical systems and methods do not allow or provide on-demand video communication services between residents and non-residents. As noted, video visitation is typically a scheduled event. In accordance with embodiments of the present systems and methods, a resident using an IFD (Intelligent Facility Device), which may be a video phone particularly adapted for use in a controlled-environment facility or an IID (Intelligent Inmate Device), similar to a tablet device or smartphone places an outbound call to a non-resident (friend or family member). One or both parties realize, or they may be prompted, that video communication is available to them. They have already paid for the voice call. However, either party can select an option on the phone/device and allow the other party to accept the request to turn the call into video, such as for a reduced fee compared typical video visitation. Once they both accept, one of the parties provides payment for it, and they are automatically connected to communicate via video communication, instead of only voice. This may operate to promoting usage of video communication, improving revenue, and at the least "upsell" the communication service from a phone call to a video communication.

Hence, embodiments of the present systems and methods, will allow either party to turn a voice only call into a video communication session. It is intended that the same levels of control and restriction would apply. That is, if the resident is not allowed video communication, this should not be a mechanism for him to skirt the security controls, further limitations, controls, allowed and block lists, etc. would also apply to the video communication.

FIG. 1 is a diagrammatic illustration of example communications environment 100, wherein example embodiments of the present systems and methods for providing on-demand video communication may be employed, according to some embodiments. As shown, communication processing system 105 may provide telephone services, videoconferencing, online chat, and other communication services to controlled-environment facility 110. In some cases, as illustrated communication system 105 may be co-located with controlled-environment facility 110. Alternatively, communication system 105 may be centrally or remotely located with respect to one or more controlled-environment facilities and/or may provide communication services to multiple controlled-environment facilities. More generally, however, it should be noted that communication system 105 may assume a variety of forms, and may be configured to serve a variety of facilities and/or users, whether within or outside of a controlled-environment facility.

Residents may use more-or-less conventional telephones 115 to access certain communication services. In some facilities, residents may also use a personal computer wireless device, such as a tablet computing device or smartphone 120, which may have been adapted and/or approved for use in controlled-environment facility. Such a device may be referred to as an Intelligent Inmate Device (IID), or the like, in a correctional institution embodiment. Also in some facilities a resident may use a video communication device 125, or the like, to place voice calls, as well as for video communication. Such a video communication device may be referred to as an Intelligent Facility Device (IFD), which may be a video phone particularly adapted for use in a controlled-environment facility. Generally speaking, video communication device/IFD 125 may be disposed in a visitation room, in a pod, as part of a kiosk, etc. As will be appreciated, IID 120, IFD 125, or other similar devices have video conferencing capabilities, or the like, to enable a party to participate in video communication sessions with other call parties, such as non-residents of the controlled-environment facility, via video communication, secure online chat, etc.

As noted, IID 120 may be a tablet computing device or smartphone adapted and/or approved for use by residents of the controlled-environment facility (within the controlled-environment facility). Each IID 120 may be particularly adapted for use in a controlled-environment. For example, in a correctional institution, jail, or the like, such an IID may be "stripped-down," particularly from the standpoint of what applications programs (apps) are provided or allowed on IID 120, and/or connectivity afforded IID 120. For example, such an IID may be adapted to only connect to a network provided by the controlled-environment facility, and/or in only certain locations, within the controlled-environment facility, such as may be controlled by availability of Wi-Fi access, or the like, only being available in certain areas, as discussed above. That is, for example, where access may be compartmentalized, leveraging the structure of the controlled-environment facility for example limiting the availability of a Wi-Fi signal providing the stream through the placement of wireless access points, antenna directionality of such wireless access points, and/or the like. Also, the IID may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on IID 120 might include apps of particular interest to residents of the controlled-environment facility. For example, IID 120 provided to inmates of correctional facilities, might include apps that may be of particular use to an inmate, in general, such as access to a legal research service, or of more specific interest, such as providing an inmate nearing release, access to employment searching apps or the like. Hence, such IIDs may be used to help soon to be released inmates transition. For example, the IID may be used to communicate with a future employer, or the like. As such, IIDs may be sponsored, or otherwise subsidized by organizations or companies, assisting with the transition of inmates into society.

In some embodiments, video communication devices 125 may be implemented as a computer-based system. For example, each of video communication devices 125 may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video communication session, video communication devices 125 may be configured to capture a video image of a resident to be transmitted to a non-resident using the camera, and to display a video image of the non-resident to the resident using the display. Video communication devices 120 may also be configured to capture an audio signal from the resident to be transmitted to a non-resident using the mouthpiece portion of the handset, and to provide an audio signal from the non-resident to the resident using the earpiece portion of the handset. Additionally or alternatively, audio received from the non-resident may be reproduced via a loudspeaker, and audio provided by the resident may be captured via a microphone. In some cases, video communication devices 125 may assume the form of any computer, tablet computer, smart phone, etc., or any other consumer device or appliance with videoconferencing capabilities. For example, in a correctional facility environment a tablet computing device may be mounted on a wall, in a hardened case as a video communication device.

To access communications services, a resident may initiate telephone services by lifting the receiver on telephone 115 or IFD 125, and/or otherwise initiating a call, such as by launching an applications program (app) on IID 120. At which time, the resident may be prompted to provide a personal identification number (PIN), other identifying information or biometrics. An interactive voice response (IVR) unit (not shown, but which may be integrated into communications processing system 105) may generate and play a prompt, or other messages, to the resident on device 115, 120 or 125. Under the control of communication processing system 105, devices 115, 120 and 125 may be capable of connecting to a non-resident's (i.e., a person not incarcerated or otherwise committed to a controlled-environment facility) device 130 or telephone 135 across a publicly switched telephone network (PSTN) 140. For example, device 130 may be a mobile phone, whereas telephone 135 may be located at a non-resident's home or office, at a resident visitation center, etc. Switch 145 in communication processing system 105 may be used to connect calls across PSTN 140. Additionally or alternatively, the non-resident may communicate using devices 150 or 155, which may be connected through an Integrated Services Digital Network (ISDN), Voice-over-IP (VoIP), or packet data network 160, such as, for example the Internet. Router 165 of communication processing system 105 is used to route data packets associated with a call connection to devices 150 or 155. For example, a non-resident party may have a personal or laptop computer 155 with a webcam, or the like, or device 150 may have an integrated camera and display (e.g., a smart phone, tablet, etc.). A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards.

Video communication system 170 may be configured to provide, schedule, and manage communication services to residents and non-residents of a controlled-environment facility. Video communication system 170 and/or communication system 105 receive and/or manage video visitation signals via network 160. Video communication system 170 may be coupled to PSTN 140 and/or network 160 in a manner similar to communication processing system 105 by also including one or more gateways, switches and/or routers (not shown). Accordingly, video communication system 170 may be configured to communicate with one or more residents of the controlled-environment facility via devices 115, 120 or 125 and with one or more non-residents via devices 130, 135, 150 or 155. To this end, video visitation system 170 may include one or more media gateways, multimedia servers, and/or the like, which may facilitate not only video communications but also conversion of a voice communication to a video communication, in accordance with various embodiments of the present systems and methods. For example, video visitation system 170 may tear down an original voice call after, or while, setting up the video communication, such as under direction of a media gateway controller, which may be separate from or integrated with video visitation system 170 and/or its media gateway(s), multimedia server(s), etc. Although video communication system 170 is shown in FIG. 1 as being located with controlled-environment facility 110 and separate from communication processing system 105, video communication system 170 may be located outside facility 110 and/or integrated within communication processing system 105.

In addition to providing certain visitation and communication operations, communication processing system 105 may attempt to ensure that a resident's calls, video conferences, online chats, etc. are performed only with non-residents whose identities, devices, email addresses, phone numbers, etc. are listed in that resident's Pre-Approved Contact (PAC) list. Each resident's PAC list may be stored, for example, in database 175 maintained by controlled-environment Administration and Management System (AMS) 180. In addition to PAC list(s), AMS 180 may also store Resident Profile Data (RPD), as well as communication and/or visitation rules applicable to each resident. As an example, in the context of a correctional facility, AMS 180 is referred to as a Jail Management System (JMS). Within the AMS or JMS 180, database 175 may include information such as balances for resident trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. Controlled-environment facility resident account management system 185, which may be a separate system, or which may be a part or function of AMS 180, as illustrated, may maintain resident accounts to the benefit of the respective resident, such as a resident communications accounts, which may be used to pay for communications, such as phone calls, video visitation, internet chats, emails, text messages, or the like. Such communications accounts may in some embodiments, include community communications accounts maintained by controlled-environment facility resident account management system 185, administration and management system 180, and/or the like, of at least one controlled-environment facility, to the benefit of a number of residents of the same of different facilities for payment of communications.

In some implementations, communications processing system 105 may be configured to perform video communication monitoring operations configured to monitor and or record video communication sessions (e.g., as electronic video files). In scenarios where communications processing system 105 is located within the controlled-environment facility, it may have direct access to AMS or JMS 180. In other embodiments, however, communications processing system 105 may be located remotely with respect to the controlled-environment facility, and access to AMS or JMS 180 may be obtained via a computer network such as, for example, network 160.

In accordance with embodiments of the present systems and methods, controlled-environment facility communications processing system 105 may include at least one processor and a memory coupled to the processor(s), storing program instructions executable by the processor(s). Controlled-environment facility communications processing system 105 may function in accordance with embodiments of the present systems and methods, to provide communications processing services to facility residents, such as to connect a voice call initiated by a resident of the controlled-environment facility to another party. This other party is typically an outside, non-resident party. However, in accordance with some embodiments of the present systems and methods, the other party may be a resident of controlled-environment facility 110 or another controlled-environment facility. Hence, similar to traditional systems and methods, communication from a controlled-environment facility may be initiated by the resident to the non-resident. The resident would lift the handset receiver of devices 115, 120, 125 or press an icon on the screen of device 120 & 125. By lifting the receiver or selecting the icon, controlled-environment facility communications processing system 105 will initiate communication setup processes to the resident (initiator) of the communication event. The controlled-environment facility communications processing system will walk the resident through language selection, communications type selection (i.e. collect call, debit call, calling card call, etc.), may require the resident to enter identifying information such as a PIN or Password, may validate a biometric print (e.g., a voice print) to validate the PIN or Password against a pre-enrolled voice file, or the like, and collect the telephone number or email address to be called or emailed. Once the resident has completed the setup process, the controlled-environment facility communications processing system will validate the information and verify that the communication is allowed to continue. The controlled-environment facility communications processing system will then process the communication to the non-resident of the controlled-environment facility. The non-resident will receive admonishment information such as rate quotes, positive acceptance of the communication, balance information, etc. Once the non-resident accepts the communication admonishments, the resident and the non-resident are connected into an established communications event (i.e., a voice call)

However, in order to provide on-demand video communication in accordance with embodiments of the present systems and methods, controlled-environment facility communications processing system 105 may accept a selection of an option by the resident or the other party to convert, enhance, or otherwise transform, the voice call into a video communication (i.e., a video visitation). This option may be presented by a voice prompt at the beginning of the call, and controlled-environment facility communications processing system 105 may employ the aforementioned IVR functionality to present the prompt and to accept answers. Additionally or alternatively, since the present systems and methods call for the use of a video communication-enabled communication device, such as devices 120, 125, 150 or 155 the option to convert the call can be presented on the video screen of the resident's communication device 120 or 125 or the screen of the other call party's communication device 150 or 155. For example, the resident may be using IFD 125, which as noted may be a video phone particularly adapted for use in a controlled-environment facility, or using an IID 120 either of which could provide a (touchscreen) prompt to the resident for selection to convert the call to a video call. Such a prompt may not be offered, if it is detected that either call party is not using a video-enabled communications device (i.e., devices 115 or 135).

Upon selection by the resident or other call party to convert the call to a video communication, controlled-environment facility communications processing system 105 may confirm that the party who did not select the option to convert the voice call to a video communication, agrees to convert the voice call to a video communication. Also, the controlled-environment facility communications processing system 105 may query controlled-environment facility AMS 180 (a JMS in a correctional institution implementation) to confirm that the resident may take part in a video communication, such as by querying database 175 of AMS 180 for RPD related to communication and/or visitation rules applicable to the resident.

In accordance with various embodiments of the present systems and methods, controlled-environment facility communications processing system 105 may establish a video communication link to set-up the requested video communication. To do so, controlled-environment facility communications processing system 105 may hand the communication over to video communication system 170 in some embodiments. The video communication link is established between a video-enabled communication device 120 or 125 in use by the resident and a video communications enabled-device 150 or 155 in use by the other party. However, this link may only be established to set-up the video communication if it is confirmed that both call parties, including the party who did not select the option to convert the voice call to a video communication agree to convert the voice call to a video communication and/or it is also confirmed that that the resident may take part in a video communication, as discussed above.

Controlled-environment facility communications processing system 105 may accept payment from the resident or the other party for the video communication. In accordance with various embodiments of the present systems and methods, this payment may be discounted compared to normal video communication in order to encourage use of video visitation through the present systems and methods as a way of introducing the parties to video communication. Controlled-environment facility communications processing system 105 may charge a resident communications account maintained by controlled-environment facility resident account management system 185 to the benefit of the resident for payment for the video communication. Where the other party is a resident of controlled-environment facility 110 or another controlled-environment facility, controlled-environment facility communications processing system 105 may charge a resident communications account maintained by controlled-environment facility resident account management system 185 to the benefit of each of the residents or charge a community communications account maintained by a controlled-environment facility resident account management system, or the like, of at least one of the controlled-environment facilities, to the benefit of both of the residents, for payment of the video communication.

FIG. 2 is a flowchart of example process 200 for on-demand video communication for controlled-environment facility residents, in accordance with some embodiments. Therein, a voice call from a resident of a controlled-environment facility (110) to another party is connected and/or otherwise established at 205, such as by or through a controlled-environment facility communications processing system (105). Normally, such a call is initiated by the resident, to a non-resident. However, in accordance with some embodiments of the present systems and methods the second party may be another resident of the same or different controlled-environment facility. Irrespective, the controlled-environment facility communications processing system (105) may offer the resident and/or the other party an opportunity to convert the voice call to a video communication at 210. The resident and/or the other party may accept the offer to convert the voice call to a video communication at 215. Then at 220, a video communication link between a video communications-enabled communication device in use by the resident (120 or 125) and a video communications-enabled communication device in use by the other party (150 or 155) is established. A controlled-environment facility communications processing system (105) may establish the video link at 220 by using, and/or handing the call off to a video communication system (170), as discussed above.

FIG. 3 is a flowchart of another example process 300 for on-demand video communication for controlled-environment facility residents, in accordance with some embodiments. Therein, in accordance with various embodiments of the present systems and methods a voice call from a resident of a controlled-environment facility to another party is connected and/or otherwise established at 305, for example by a controlled-environment facility communications processing system (105). As noted, such a call is typically initiated by the resident, to a non-resident, but in accordance with some embodiments of the present systems and methods, the second party may be another resident of the same or different controlled-environment facility. Regardless, at 310 the controlled-environment facility communications processing system, or the like (e.g. an IVR, or IVR functionality of a controlled-environment facility communications processing system) may accept a selection of an option by the resident or the other call party to convert the voice call to a video communication between the resident and the other call party. Whereupon, the controlled-environment facility communications processing system (105) may confirm that the call party, who did not select the option to convert the voice call to a video communication, agrees to convert the voice call to a video communication at 315.

In response to confirming that the call party, who did not select the option to convert the voice call to a video communication, agrees to convert the voice call to a video communication at 315, the call is converted at 320. For example the controlled-environment facility communications processing system (105) may, such as in conjunction with a video communication system (170), establish a video communication link between a video communications-enabled communication device in use by the resident (120 or 125) and a video communications-enabled communication device in use by the other party (150 or 155) However, if the controlled-environment facility communications processing system cannot confirm at 315 that both call parties wish to convert the call to a video communication, the call continues as a voice call at 325.

In accordance with various embodiments of the present systems and methods, such as either of processes 200 and 300, the controlled-environment facility communications processing system may confirm that the resident may take part in a video communication, prior to establishing a video communications link at 220 or 320, such as by querying a controlled-environment facility administration and management system (180) (e.g., a Jail Management System (JMS) in a correctional institution implementation), as discussed above.

FIG. 4 is a flowchart of further example process 400 for on-demand video communication for controlled-environment facility residents, according to some embodiments. In accordance with such embodiments of the present systems and methods, a voice call from a resident of a controlled-environment facility to another party is connected and/or otherwise established, such as by or through a controlled-environment facility communications processing system (105), at 405. Again, such a call is typically initiated by the resident to a non-resident, but in accordance with some embodiments of the present systems and methods, the second party may be another resident of the same or different controlled-environment facility. At 410, the controlled-environment facility communications processing system (105), or the like, may accept a selection of an option by the resident or the other call party to convert the voice call to a video communication between the resident and the other call party (such as via a touchscreen or IVR response, as discussed above).

Whereupon, the controlled-environment facility communications processing system (105) may confirm that the call party, who did not select the option to convert the voice call to a video communication, agrees to convert the voice call to a video communication at 415, again, such as via a touchscreen or IVR exchange. If the controlled-environment facility communications processing system cannot confirm at 415 that both call parties wish to convert the call to a video communication (e.g., the other party declines conversion of the voice call to a video visitation), the call continues as a voice call, at 420.

However, if it is confirmed at 415 (and 410) that both parties wish to convert the voice call to a video communication, the controlled-environment facility communications processing system may then, at 425, confirm that the resident may take part in a video communication, such as by querying a controlled-environment facility administration and management system (180) (e.g., a Jail Management System (JMS) in a correctional institution implementation), such as in the manner discussed above. If the controlled-environment facility communications processing system (105) and/or AMS (180) cannot confirm at 425 that the resident may take part in a video communication (e.g., in a correctional institution implementation, the inmate/resident is not allowed video communication due to disciplinary reasons), the call continues as a voice call at 420.

If the controlled-environment facility communications processing system (105) and/or AMS (180) confirms at 425 that the resident may take part in a video communication, then at 430 a video communication link between a video communications-enabled communication device in use by the resident (120 or 125) and a video communications-enabled communication device in use by the other party (150 or 155) may be established by the controlled-environment facility communications processing system (105), such as through a video communication system (170).

Hence, embodiments of the present systems and methods, bridge voice calls and video communication together into an on-demand service. While the resident is on the phone with a non-resident and they are having a paid for conversation, either party can initiate a video communication (turn the voice call into a video communication event, on-demand).

Further, prior to establishing a video communications link (i.e. at 220, 320, 430, or the like) payment from the resident or the other party for the video communication may be required. Either party may pay for the video communication, such by using a prepaid account, debit account, credit card, through a post paid bill, or the like. For example, in accordance with various embodiments of the present systems and methods, a resident communications account maintained by the controlled-environment facility for the benefit of the resident may be charged for payment of the video communication. Alternatively or additionally, the other call party may pay for the conversion such as in the case of an outside-non-resident call party, through the use of a credit or debit card, using a prepaid calling card, through a check-by-phone, by charge to the call party's telephone account, or the like. Where the other call party is also a resident of the same or a different controlled-environment facility, the second resident may alternatively or additionally pay for converted communication such as through a resident communications account maintained by the second resident's controlled-environment facility for the benefit of the second resident. Regardless, in accordance with certain embodiments, the payment may be discounted, compared to normal video communication, in order to facilitate introduction of the resident and/or other call party to video communication.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method comprising:
    connecting a voice call from a resident of a controlled-environment facility to another party by a controlled-environment facility communications processing system;
    offering, by the controlled-environment facility communications processing system, the resident or the other party an opportunity to convert the voice call to a video communication; and
    establishing, by the controlled-environment facility communications processing system, a video communication link between a communication device in use by the resident and a communication device in use by the other party in response to the resident or the other party accepting the offer to convert the voice call to a video communication.

2. The method of claim 1, further comprising confirming, by the controlled-environment facility communications processing system, that the resident may take part in a video communication, prior to establishing the video communications link.

3. The method of claim 2, wherein the confirming further comprises querying a controlled-environment facility administration and management system, by the controlled-environment facility communications processing system, as to whether the resident may take part in a video communication.

4. The method of claim 1, further comprising accepting payment from the resident or the other party for the video communication.

5. The method of claim 1, further comprising charging a resident communications account maintained by the controlled-environment facility for the benefit of the resident for payment of the video communication.

6. The method of claim 1, wherein the other party is a non-resident of a controlled-environment facility.

7. The method of claim 6, further comprising accepting payment from the non-resident for the video communication.

8. The method of claim 1, wherein the other party is a resident of the controlled-environment facility.

9. The method of claim 1, wherein the other party is a resident of another controlled-environment facility.

10. A tangible computer-readable storage medium having program instructions stored thereon that, upon execution by a controlled-environment facility communications processing system, cause the controlled-environment facility communications processing system to:

connect a voice call from a resident of a controlled-environment facility to another party;

accept a selection of an option by the resident or the other party to convert the voice call to a video communication between the resident and the other party;

confirm that the resident or other party, who did not select the option to convert the voice call to a video communication, agrees to convert the voice call to a video communication; and establish a video communication link between a communication device in use by the resident and a communication device in use by the other party, in response to confirmation that the resident or other party, who did not select the option to convert the voice call to a video communication, agrees to convert the voice call to a video communication.

11. The tangible computer-readable storage medium of claim 10, the program instructions further executable by the controlled-environment facility communications processing system to confirm that the resident may take part in a video communication, prior to establishing the video communications link.

12. The tangible computer-readable storage medium of claim 11, the program instructions further executable by the controlled-environment facility communications processing system to confirm that the resident may take part in a video communication by querying a controlled-environment facility administration and management system as to whether the resident may take part in a video communication.

13. The tangible computer-readable storage medium of claim 10, the program instructions further executable by the controlled-environment facility communications processing system to accept payment from the resident or the other party for the video communication.

14. The tangible computer-readable storage medium of claim 10, the program instructions further executable by the controlled-environment facility communications processing system to charge a resident communications account maintained by the controlled-environment facility for the benefit off the resident for payment for the video communication.

15. The tangible computer-readable storage medium of claim 10, wherein the other party is a non-resident of a controlled-environment facility.

16. The tangible computer-readable storage medium of claim 15, the program instructions further executable by the controlled-environment facility communications processing system to accept payment from the non-resident for the video communication.

17. The tangible computer-readable storage medium of claim 10, wherein the other party is a resident of the controlled-environment facility.

18. The tangible computer-readable storage medium of claim 10, wherein the other party is a resident of another controlled-environment facility.

19. A controlled-environment facility communications processing system comprising:
at least one processor; and
a memory coupled to the at least one processor, wherein the memory stores program instructions, and wherein the program instructions are executable by the at least one processor to:

connect a voice call from a resident of a controlled-environment facility to another party;

accept a selection of an option by the resident or the other party to convert the voice call to a video communication between the resident and the other party;

confirm that the resident or other party, who did not select the option to convert the voice call to a video communication, agrees to convert the voice call to a video communication;

query a controlled-environment facility administration and management system to confirm that the resident may take part in a video communication; and establish a video communication link between a communication device in use by the resident and a communication device in use by the other party, in response to confirmation that the resident or other party, who did not select the option to convert the voice call to a video communication, agrees to convert the voice call to a video communication and confirmation that that the resident may take part in a video communication.

20. The controlled-environment facility on-demand video communication system of claim 19, wherein the program instructions are further executable by the at least one processor to accept payment from the resident or the other party for the video communication.

21. The controlled-environment facility on-demand video communication system of claim 19, wherein the program instructions are further executable by the at least one processor to charge a resident communications account maintained by the controlled-environment facility for the benefit of the resident for payment of the video communication.

22. The controlled-environment facility on-demand video communication system of claim 19, wherein the other party is a non-resident of a controlled-environment facility.

23. The controlled-environment facility on-demand video communication system of claim 22, wherein the program instructions are further executable by the at least one processor to accept payment from the non-resident for the video communication.

24. The controlled-environment facility on-demand video communication system of claim 19, wherein the other party is a resident of the controlled-environment facility and the program instructions are further executable by the at least one processor to charge a resident communications account maintained by the controlled-environment facility for the benefit of each of the residents or charge a community communications account maintained by the controlled-environment facility for the benefit of both of the residents, for the video communication.

25. The controlled-environment facility on-demand video communication system of claim 19, wherein the other party is a resident of another controlled-environment facility and the program instructions are further executable by the at least one processor to charge a resident communications account maintained by each of the controlled-environment facilities for the benefit of each of the residents or charge a community communications account maintained by at least one of the controlled-environment facilities for the benefit of both of the residents, for the video communication.

* * * * *